(12) United States Patent
Park

(10) Patent No.: US 7,443,460 B2
(45) Date of Patent: Oct. 28, 2008

(54) BACKLIGHT ASSEMBLY FOR LIQUID CRYSTAL DISPLAY AND LIQUID CRYSTAL DISPLAY MODULE USING THE SAME

(75) Inventor: Jong Wan Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 307 days.

(21) Appl. No.: 11/477,388

(22) Filed: Jun. 30, 2006

(65) Prior Publication Data

US 2007/0109461 A1    May 17, 2007

(30) Foreign Application Priority Data

Nov. 16, 2005   (KR) .................... 10-2005-0109533

(51) Int. Cl.
*G02F 1/1333* (2006.01)
(52) U.S. Cl. ....................................... 349/58
(58) Field of Classification Search ............. 349/58, 349/60, 65, 114, 187
See application file for complete search history.

(56) References Cited

U.S. PATENT DOCUMENTS

| | | | |
|---|---|---|---|
| 6,835,961 B2* | 12/2004 | Fukayama | 349/59 |
| 6,847,417 B2* | 1/2005 | Kim | 349/58 |
| 6,950,154 B2 | 9/2005 | Lee | |
| 7,106,393 B2 | 9/2006 | Lee | |
| 7,248,307 B2* | 7/2007 | Han | 349/58 |
| 2002/0024623 A1* | 2/2002 | Kim et al. | 349/58 |
| 2005/0151894 A1* | 7/2005 | Katsuda et al. | 349/58 |

FOREIGN PATENT DOCUMENTS

| | | |
|---|---|---|
| CH | 1461965 | 12/2003 |
| JP | 11337942 A  * | 12/1999 |

* cited by examiner

*Primary Examiner*—Quyen P Leung
(74) *Attorney, Agent, or Firm*—Morgan Lewis & Bockius LLP

(57) ABSTRACT

A backlight assembly for a liquid crystal display includes a lamp to irradiate light; a light guide plate to guide incident light from the lamp to a display panel; a plurality of optical sheets disposed in front of the light guide plate, and each optical sheet having an eye part with a through-hole; a guide panel to house the lamp, and having a jaw-like step part to mount the light guide plate and the optical sheets; and an adhesive pad having a lower end that passes through the through-hole and provided on the guide panel, and an upper end that adheres to the display panel.

13 Claims, 6 Drawing Sheets

BACKLIGHT ASSEMBLY FOR LIQUID CRYSTAL DISPLAY AND LIQUID CRYSTAL DISPLAY MODULE USING THE SAME

The present invention claims the benefit of Korean Patent Application No. 2005-0109533 filed in Republic of Korea on Nov. 16, 2005, which is hereby incorporated by reference.

BACKGROUND OF THE INVENTION

1. Field of the Invention

The present invention relates to a backlight assembly for a liquid crystal display and a liquid crystal display module using the same.

2. Discussion of the Related Art

A liquid crystal display (LCD) device is one of the various flat panel display devices that produce high quality images on the screen. In addition, the LCD devices are thin, light weight, consume lower power, and dissipate lower heat compared to the same screen size Cathode Ray Tubes (CRT). Accordingly, the LCD devices including a plasma display panel device and a field emission display device attract attention as a next generation display device for a wireless phone, a computer monitor, and a television set.

However, the liquid crystal display can be easily damaged by an external impact. Therefore, a liquid crystal display module (LCM) employing a case for protecting the liquid crystal display is used. A typical construction of a related art liquid crystal display module will be described as follows.

FIG. 1 is a sectional view illustrating the related art liquid crystal display module, and FIG. 2 is a plane view illustrating the related art liquid crystal display module. Referring to FIG. 1, the related art liquid crystal display module (LCM) includes a guide panel 17, a backlight unit and a liquid crystal panel 11 mounted on the guide panel 17, a bottom cover 18 for covering a lower surface and a side surface of the guide panel 17, and a top cover 19 for covering a portion of the top edge and side surface of the liquid crystal panel 17. The guide panel 17 is formed using a metal mold and has a jaw-like step part.

A reflecting plate 16, a light guide plate 15, optical sheets 14, and a lamp housing (not shown) are sequentially mounted on the guide panel 17. Polarization plates 12 and 13 are layered on the liquid crystal panel 11, where liquid crystal is injected between upper/lower substrates 11a and 11b. The light guide plate 15 guides light generated from the lamp toward the liquid crystal panel 11. The optical sheets 14 generally include upper/lower diffusion sheets and upper/lower prism sheets. The optical sheets 14 serve to diffuse the light guided from the light guide plate 15, and collect and forward the diffused light in a vertical direction to a front surface of the liquid crystal panel.

The liquid crystal panel 11 has a liquid crystal injected between the lower substrate 11b, having switching elements mounted thereon, and the upper substrate 11a, having a color filter. The lower polarization plate 13 is attached to a lower surface of the liquid crystal panel 11, and polarizes light passing through the optical sheets 14. The upper polarization plate 12 is attached to a front surface of the liquid crystal panel 11, and polarizes light passing through the liquid crystal panel 11. The bottom cover 18 includes a plane part and a side part that bends vertically from the plane part to cover the lower and side surfaces of the guide panel 17. The top cover 19 is provided in a rectangular frame shape and covers an edge and side surfaces of the liquid crystal panel 11.

Accordingly, the reflecting plate 16, the light guide plate 15, the optical sheets 14, and the liquid crystal panel 11 are sequentially mounted on the guide panel 17. A gap (d) is formed between the edge of the liquid crystal panel 11 and the edge of the guide panel 17 because of manufacture tolerances between the respective parts. As shown in FIG. 2, having the gap (d) greatly influences the stability of the liquid crystal panel 11 because the liquid crystal panel 11 can shift. In other words, if the external impact is applied to the liquid crystal display module, the liquid crystal panel 11 shifts in the gap (d) formed between the liquid crystal panel 11 and the guide panel 17. Thus, this shifting causes a friction between the surfaces of the liquid crystal panel 11 and the guide panel 17.

In addition, since the guide panel 17 is constructed using a mold, the friction generates a foreign material. Specifically, the friction is formed between the lower polarization plate 13 attached to the liquid crystal panel 11 and the optical sheets 14 facing the lower polarization plate 13, thereby causing a noise. Furthermore, light passing through the optical sheets 14 does not get forwarded to the liquid crystal panel 11 in the vertical direction, thus creating a white stain and greatly deteriorating a picture quality.

SUMMARY OF THE INVENTION

Accordingly, the present invention is directed to a backlight assembly for liquid crystal display and liquid crystal display module using the same that substantially obviate one or more of the problems due to limitations and disadvantages of the related art.

An object of the present invention is to provide the backlight assembly that prevents shifting of the liquid crystal panel.

Another object of the present invention is to provide the liquid crystal display module that can minimize the white stain.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the backlight assembly for a liquid crystal display includes a lamp to irradiate light; a light guide plate to guide incident light from the lamp to a display panel; a plurality of optical sheets disposed in front of the light guide plate, and each optical sheet having an eye part with a through-hole; a guide panel to house the lamp, and having a jaw-like step part to mount the light guide plate and the optical sheets; and an adhesive pad having a lower end that passes through the through-hole and provided on the guide panel, and an upper end that adheres to the display panel.

In another aspect, a liquid crystal display module includes a liquid crystal panel positioned front side of the module to output an image; a lamp to irradiate light to the liquid crystal panel; a light guide plate to guide incident light from the lamp to the liquid crystal panel; a plurality of optical sheets disposed in front of the light guide plate, each optical sheet having an eye part with a through-hole; a guide panel to house the lamp and having a jaw-like step part to mount the light guide plate and the optical sheets; an adhesive pad having a lower end that passes through the through-hole and provided on the guide panel, and an upper end that adheres to the liquid crystal panel to prevent shifting of the liquid crystal panel; a bottom cover to mount the guide panel, wherein the light guide plate, the optical sheets, and the liquid crystal panel are sequentially mounted on the guide panel; and a top cover to cover edges of the front surface of the liquid crystal panel and a side of the guide panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF PREFERRED EMBODIMENTS

Reference will now be made in detail to the preferred embodiments of the present invention, examples of which are illustrated in the accompanying drawings.

Figure 1:
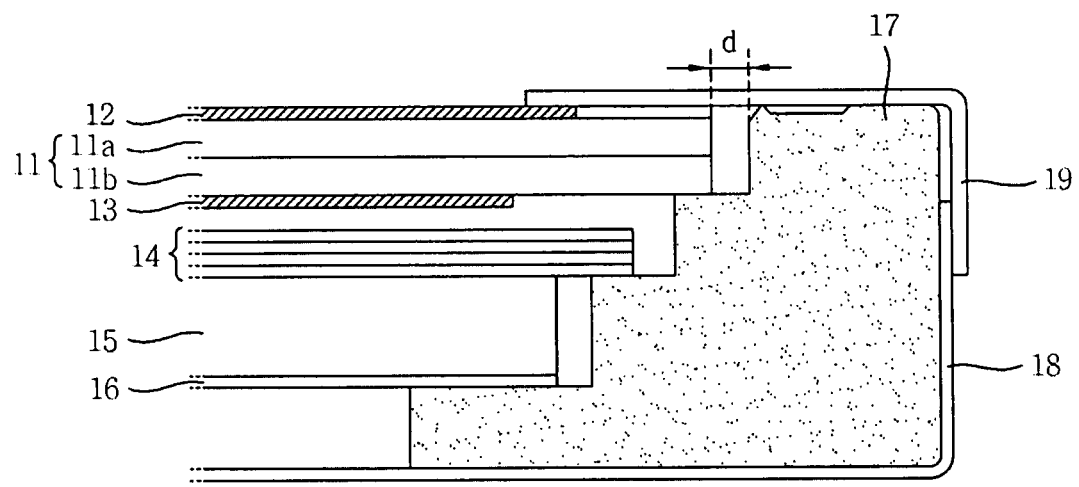
FIG. 1 is a sectional view illustrating a related art liquid crystal display module.
Figure 2:
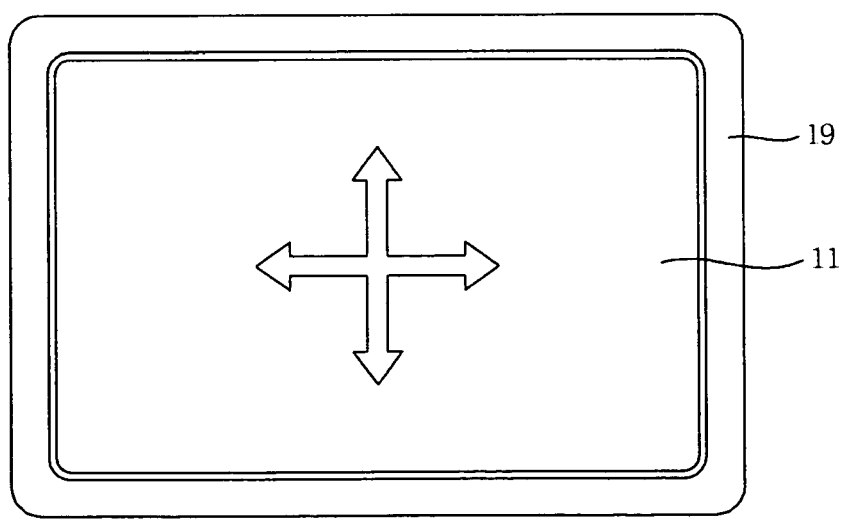
FIG. 2 is a plane view illustrating the related art liquid crystal display module.
Figure 3:
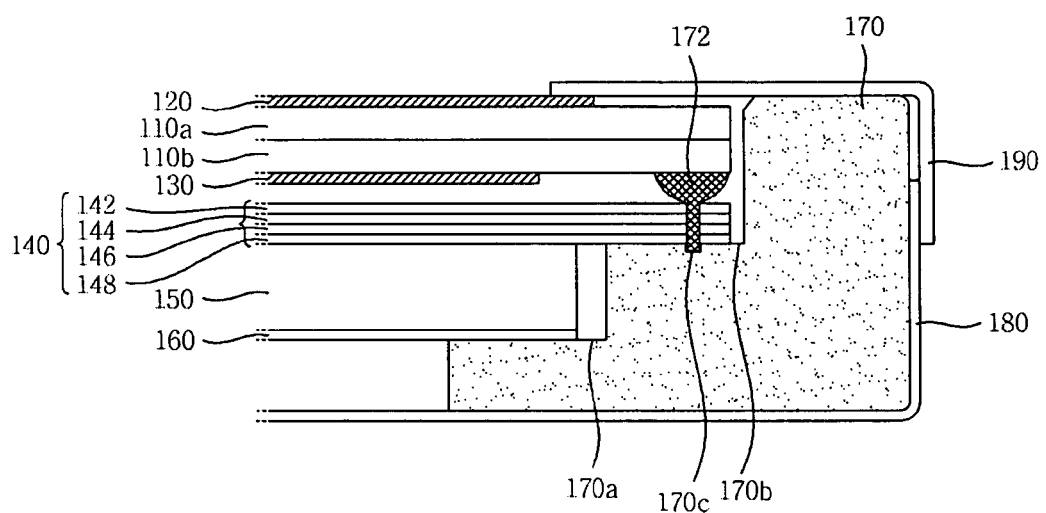
FIG. 3 is a sectional view illustrating a liquid crystal display module according to a first exemplary embodiment of the present invention.
Figure 4:
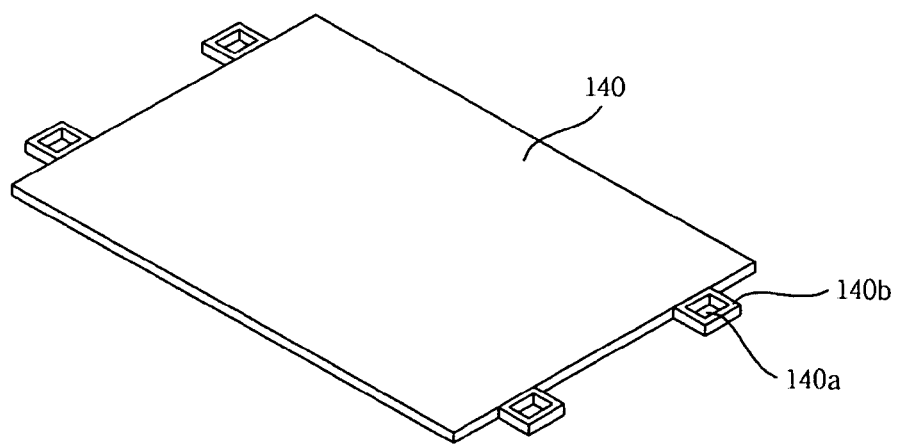
FIG. 4 is a view detailing an optical sheet of a liquid crystal display module according to the first exemplary embodiment of the present invention.
Figure 5:
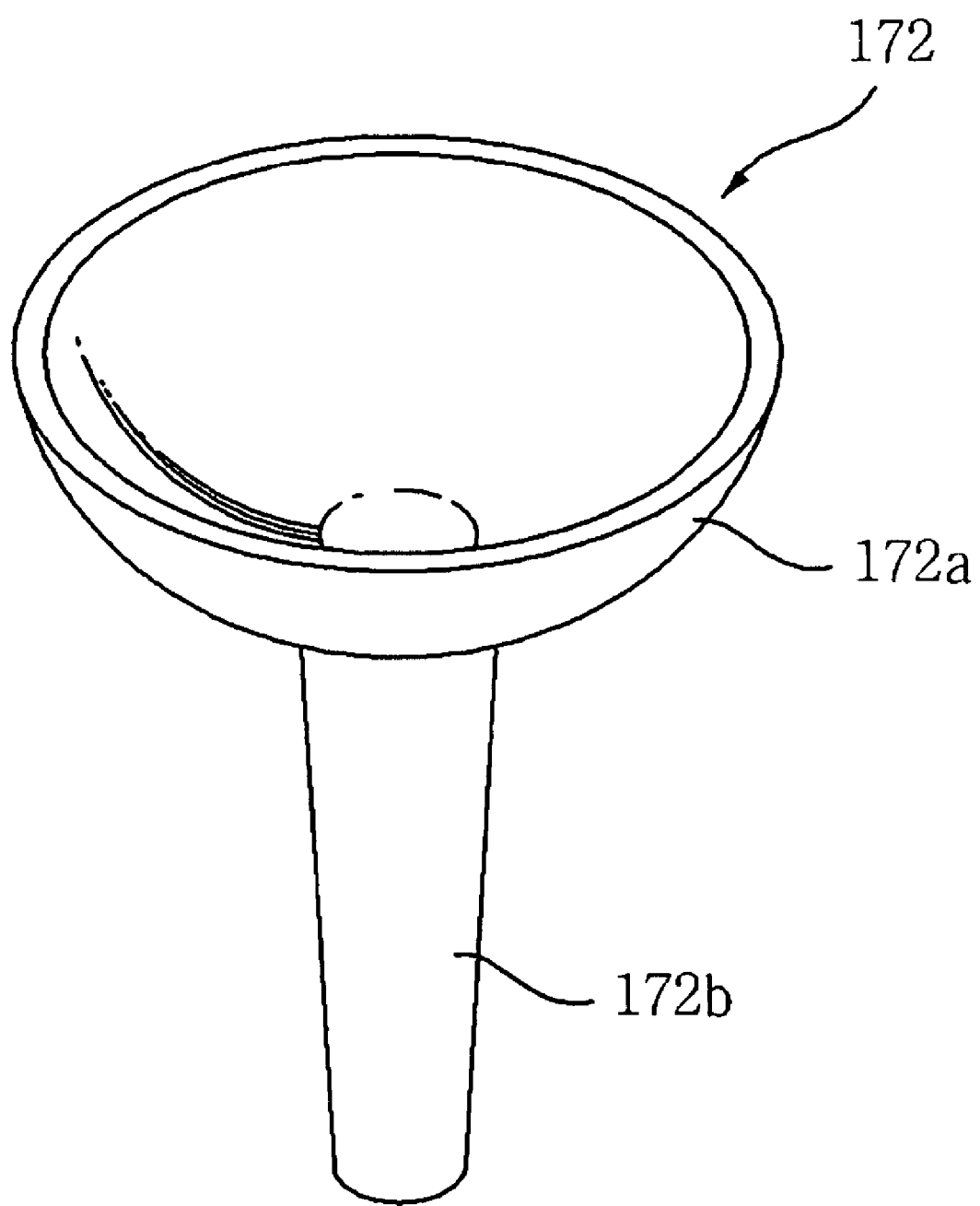
FIG. 5 illustrates an adhesive pad of a liquid crystal display module according to the first exemplary embodiment of the present invention.
Figure 6:
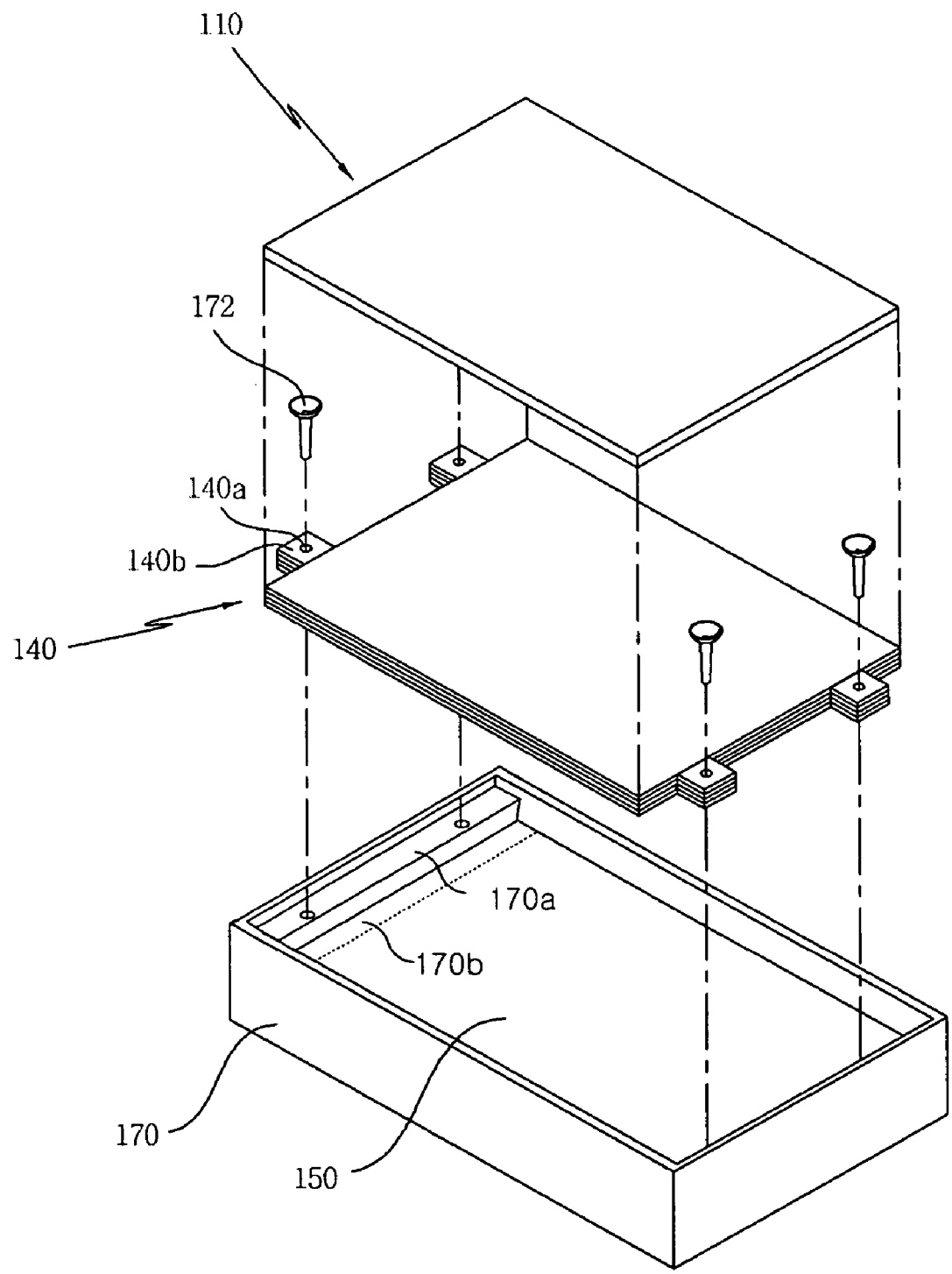
FIG. 6 illustrates a structure of a backlight assembly according to the first exemplary embodiment of the present invention.

FIG. 3 is a sectional view illustrating a liquid crystal display module according to a first exemplary embodiment of the present invention, FIG. 4 is a view detailing an optical sheet of FIG. 3, FIG. 5 is illustrating an adhesive pad of FIG. 3, and FIG. 6 is illustrating a structure of a backlight assembly of FIG. 3.

Referring to FIG. 3, the liquid crystal display module according to the first exemplary embodiment of the present invention includes a liquid crystal panel 110 provided at the front side of the module to output images, a backlight assembly (not shown) for providing a light source to the liquid crystal panel 110, a bottom cover 180 for mounting the liquid crystal panel 110 and the backlight assembly therein, and a top cover 190 covering an edge and a side part of the liquid crystal panel 110.

The liquid crystal display module further includes two polarization plates 120 and 130 attached at upper and lower surfaces of the liquid crystal panel 110, respectively. As shown in FIG. 3, the liquid crystal panel 110 has a structure that the liquid crystal is injected between the lower substrate 110b where the switching elements are mounted thereon and the upper substrate 110a having a color filter. The lower polarization plate 130 is attached to the rear surface of the liquid crystal panel 110 and polarizes light passing through a plurality of optical sheets 140. The upper polarization plate 120 is attached to a front surface of the liquid crystal panel 110 and polarizes light passing through the liquid crystal panel 110.

The backlight assembly (not shown) includes a lamp (not shown) for irradiating light to the liquid crystal panel 110, a light guide plate 150 for guiding incident light from the lamp (not shown) to the liquid crystal panel 110, a reflecting plate 160 disposed at rear side of the light guide plate 150, the plurality of optical sheets 140 disposed in front of the light guide plate 150, a guide panel 170 for housing the lamp and guiding and mounting the light guide plate 150 and the plurality of optical sheets 140, and an adhesive pad 172 having an adhesive property to fix the liquid crystal panel 110 and each optical sheets 140 to the guide panel 170.

In detail, the light guide plate 150 converts light generated from the lamp into a surface light source and guides the converted light source to the liquid crystal panel 110. The reflecting plate 160 reflects light emitted from the rear side of the light guide plate 150 toward the liquid crystal panel 110, thereby reducing light loss. The plurality of optical sheets 140 serve to diffuse and collect the incident light from the light guide plate 150 and forward the collected light in a vertical direction to the front surface of the liquid crystal panel 110.

As shown in FIG. 4, each of the plurality of optical sheets 140 includes a plurality of eye parts 140b with through-holes 140a provided at two sides of the sheet. The optical sheets 140 include upper and lower prism sheets 142 and 144 and upper and lower diffusion sheets 146 and 148 (FIG. 3). The eye part 140b can be provided two each at two sides of the optical sheet that faces each other. However, the number of eye parts 140b is not limited. Thus, the eye part 140b can be provided in different numbers at different positions.

The guide panel 170 houses the lamp and is fabricated using a metal mold. The guide panel 170 has a jaw-like step part for supporting and mounting the reflecting plate 160, the light guide plate 150, and each of the plurality of optical sheets 140. The jaw-like step part includes a first mounting surface 170a for mounting the reflecting plate 160 and the light guide plate 150, a second mounting surface 170b for mounting the plurality of optical sheets 140, and an insertion groove 170c on the second mounting surface. Viewing from bottom to top in FIG. 3, the reflecting plate 160, the light guide plate 150, and the optical sheets 140 including the diffusion sheets 146 and 148 and the prism sheets 142 and 144 are sequentially mounted on the guide panel 170.

An adhesive pad 172 is formed of silicon having excellent adhesive property. As shown in FIG. 5, the adhesive pad 172 includes a body 172a having a cup shape and a support 172b to support the body 172a. Referring to FIGS. 3 and 6, the support 172b passes through the through-hole 140a provided at the plurality of optical sheets 140 then positions the tip of the support 172b in the insertion groove 170c. The body 172a is adhered to the liquid crystal panel 110 like a vacuum cup, thereby preventing the shifting of the liquid crystal panel 110. In addition to the adhesive property, the adhesive pad 172 can be easily removed from the liquid crystal panel without leaving the trace of silicon material on the panel. Accordingly, when the adhesive pad 172 is disengaged from the liquid crystal panel 110, the adhesive material will not be left on the liquid crystal panel 11O. Thus, recycling the liquid crystal panel 10 can be achieved and re-assembling another liquid crystal display module can be implemented.

As shown in FIG. 3, the insertion groove 170c has a room enough to accept the support 172b of the adhesive pad 172.

The adhesive pad 172 is provided at the location matching the eye part 140b to adhere to the liquid crystal panel 110, thereby preventing the shifting of the liquid crystal panel 10. Accordingly, gap (d) of the manufacture tolerance may be void.

The bottom cover 180 includes a plane part and a side part that bends vertically from the plane part to cover the lower and the side surfaces of the guide panel 170. The top cover 190 is fabricated in a rectangular band shape having a plane part and a side part that also bends vertically from the plane part. The top cover 190 covers the front edge part of the liquid crystal panel 110 and side of the guide panel 170. As shown in FIGS. 3 and 6, the top cover. 190, the liquid crystal panel 10, other required parts, and the bottom cover 180 are assembled into the liquid crystal display module.

Figure 7:
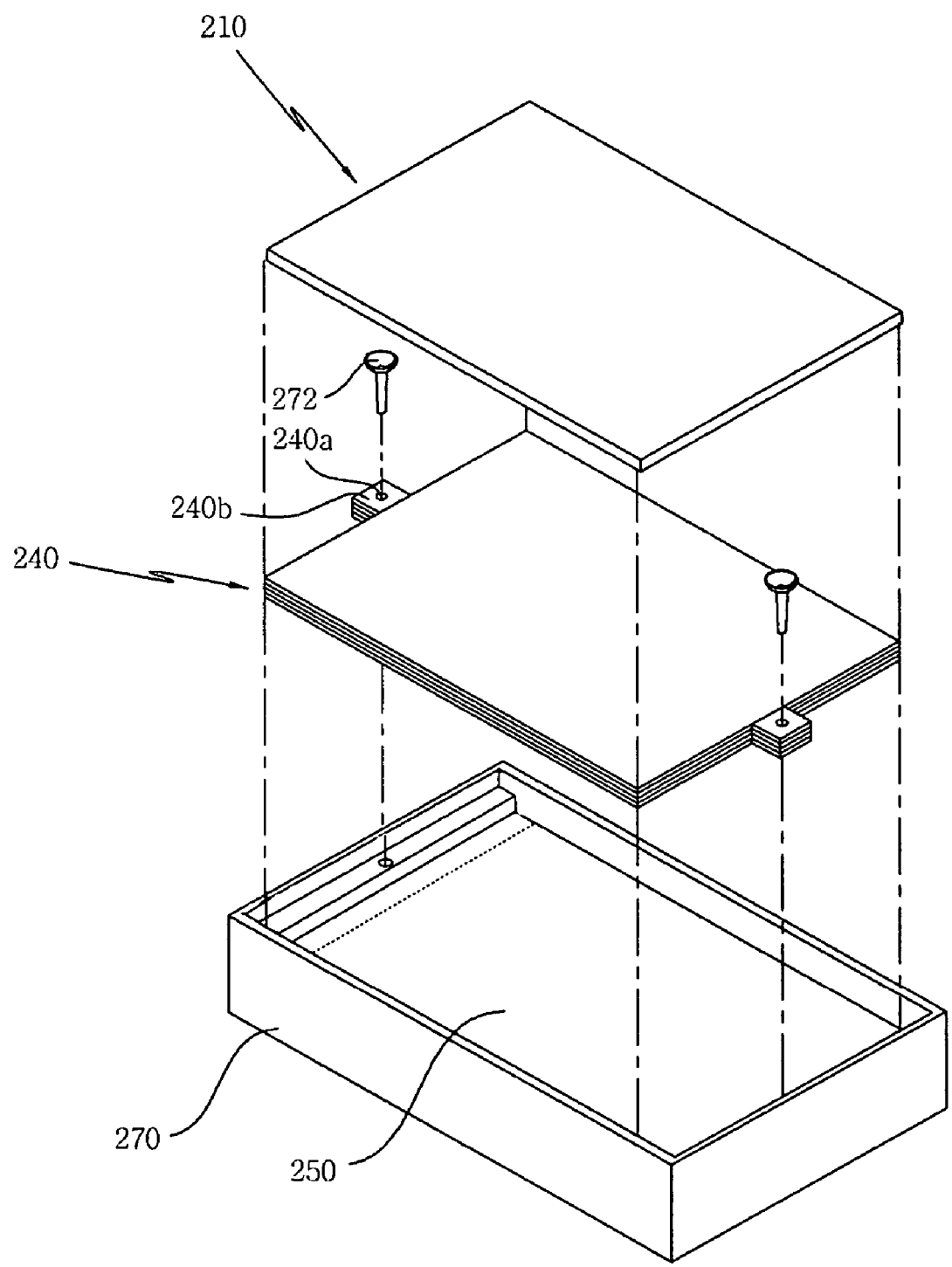
FIG. 7 illustrates a structure of a backlight assembly according to a second exemplary embodiment of the present invention.
Figure 8:
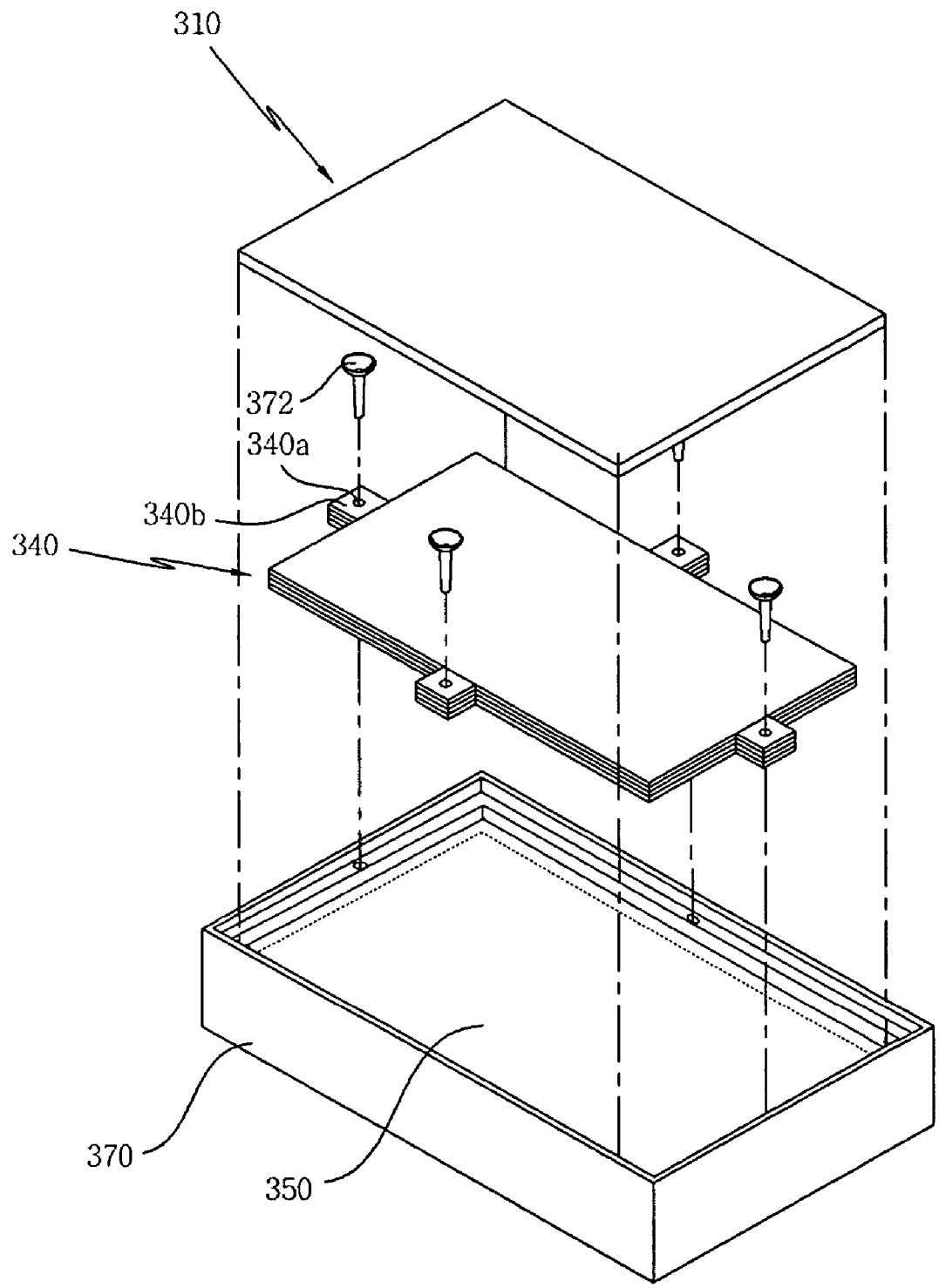
FIG. 8 illustrates a structure of a backlight assembly according to a third exemplary embodiment of the present invention.

FIG. 7 illustrates a structure of a backlight assembly according to a second exemplary embodiment of the present invention, and FIG. 8 illustrates a structure of a backlight assembly according to a third exemplary embodiment of the present invention. Referring to FIG. 7, the second exemplary backlight assembly includes a guide panel 270 having a jaw-like step part; a reflecting plate (not shown) and a light guide plate 250, a plurality of optical sheets 240 disposed on the light guide plate 250 and having eye parts 240b with through-holes 240a, and adhesive pads 272 provided at locations matching the eye parts 240b of the optical sheets 240.

The backlight assembly of FIG. 7 is similar to that of FIGS. 3 and 6 that the eye part 240b is provided at two sides of the optical sheets that faces each other. However, unlike the first exemplary embodiment, only one eye part 240b per single side is provided. Two adhesive pads 272 are provided passing through the through-hole 240a of the eye parts 240b and these adhesive pads fix the plurality of optical sheets 240 to a second mounting surface (not shown) of the guide panel 270. In addition, the liquid crystal panel 210 is fixed to the guide panel 270 using the same adhesive pads 272.

Similarly, the third exemplary backlight assembly as shown in FIG. 8 includes a guide panel 370 having a jaw-like part; a reflecting plate (not shown) and a light guide plate 350, and a plurality of optical sheets 340. Each optical sheet 340 is provided with four eye parts 340b, where the eye parts 340b are provided one at each side of the sheet. Four adhesive pads 372 are provided at locations matching with the four eye part 340b to fix the optical sheets to a second mounting surface (not shown) of the guide panel 370. The number of eye parts 340b and the matching adhesive pads 372 are not limited, and can be increased.

As described above, the present invention has advantages that the liquid crystal panel disposed at front side of the optical sheets is fixed to the guide panel with the adhesive pad, thereby preventing the shifting of the liquid crystal panel. Accordingly, the present invention minimizes the white stain and prevents deterioration of the picture quality. Furthermore, the liquid crystal panel can be recycled many times since the adhesive pad can be easily disengaged from the panel without leaving the trace of adhesive material. Moreover, the exemplary backlight assembly can be manufactured without extensive modification to the related art assembly structure, thereby the present invention can be easily implemented.

It will be apparent to those skilled in the art that various modifications and variations can be made in the backlight assembly for liquid crystal display and liquid display module using the same of the present invention without departing from the spirit or scope of the invention. Thus, it is intended that the present invention cover the modifications and variations of this invention provided they come within the scope of the appended claims and their equivalents.

What is claimed is:

1. A backlight assembly for a liquid crystal display, the assembly comprising:
   a lamp to irradiate light;
   a light guide plate to guide incident light from the lamp to a display panel;
   a plurality of optical sheets disposed in front of the light guide plate, and each optical sheet having an eye part with a through-hole;
   a guide panel to house the lamp, and having a jaw-like step part to mount the light guide plate and the optical sheets; and
   an adhesive pad having a lower end that passes through the through-hole and provided on the guide panel, and an upper end that adheres to the display panel.

2. The assembly of claim 1, further comprising a reflecting plate to reflect light emitted from the light guide plate.

3. The assembly of claim 1, wherein the adhesive pad is formed of silicon.

4. The assembly of claim 3, wherein the adhesive pad comprises:
   a cup shaped body that adheres to the display panel; and
   a support supporting the body that fixes to the guide panel.

5. The assembly of claim 4, wherein the guide panel has an insertion groove where the support passing through the through-hole is inserted and fixed.

6. A liquid crystal display module, comprising:
   a liquid crystal panel positioned front side of the module to output an image;
   a lamp to irradiate light to the liquid crystal panel;
   a light guide plate to guide incident light from the lamp to the liquid crystal panel;
   a plurality of optical sheets disposed in front of the light guide plate, each optical sheet having an eye part with a through-hole;
   a guide panel to house the lamp and having a jaw-like step part to mount the light guide plate and the optical sheets;
   an adhesive pad having a lower end that passes through the through-hole and provided on the guide panel, and an upper end that adheres to the liquid crystal panel to prevent shifting of the liquid crystal panel;
   a bottom cover to mount the guide panel, wherein the light guide plate, the optical sheets, and the liquid crystal panel are sequentially mounted on the guide panel; and
   a top cover to cover edges of the front surface of the liquid crystal panel and a side of the guide panel.

7. The module of claim 6, wherein the adhesive pad is formed of silicon.

8. The module of claim 6, wherein the adhesive pad comprises:
   a body having a cup shape; and
   a support to support the body.

9. The module of claim 8, wherein the guide panel has an insertion groove where the support passing through the through-hole is inserted and fixed.

10. The module of claim 8, wherein the jaw-like step part of the guide panel comprises:
   a first mounting surface to mount the light guide plate; and
   a second mounting surface to mount the optical sheets.

11. The module of claim 10, wherein the second mounting surface has an insertion groove.

12. The module of claim 6, wherein the adhesive pad is provided at least two at two sides of the optical sheets that faces each other.

13. The module of claim 6, wherein the adhesive pad is provided at least one at each side of the optical sheets.

* * * * *